Patented Nov. 25, 1952

2,619,491

UNITED STATES PATENT OFFICE 2,619,491

TETRAHYDROPYRANYL ETHERS

Curtis W. Smith, Berkeley, Calif., assignor to Shell Development Company, San Francisco, Calif., a corporation of Delaware No Drawing. Application July 8, 1948,
Serial No. 37,515

9 Claims. (Cl. 260—333)

This invention relates to new and useful chemical compounds and to a process for their preparation. More particularly, the present invention relates to valuable organic compounds containing a plurality of oxygen and/or sulfur atoms and to a process for the preparation of the same. One of the embodiments of the invention relates particularly to novel polymerizable organic compounds and to preparation of the same, and to the preparation of the novel compounds in their polymeric form and to the polymeric products thus obtained.

The compounds to which the invention relates are compounds that may be prepared by reacting under controlled conditions 2-(3,4-dihydro-1,2-pyranyl) ethers with ROH and RSH compounds (R=hydrocarbon). It unexpectedly has been discovered that under selected conditions the reaction between the dihydropyranyl ether and the ROH or RSH compound may be so directed that one molecule of each interacts to produce valuable and novel derivatives of tetrahydropyran. It has been further and surprisingly discovered that by suitably controlling the conditions of reaction, not only one, but two molecules of the ROH or RSH compound may be caused to react with the dihydropyranyl ether to produce still further valuable derivatives of tetrahydropyran. Under suitable conditions, even three or four molecules of the ROH compound may be caused to react with the 2-(3,4-dihydro-1,2-pyranyl)-ethers to produce still further novel and valuable reaction products. The various products thus obtained, and the methods for their preparation, form important objects of the present invention.

It has been discovered in accordance with the invention that valuable unsaturated organic compounds may be prepared by reacting under controlled conditions unsaturated alcohols and unsaturated thiols with 2-(3,4-dihydro-1,2-pyranyl) alkyl ethers to produce heterocyclic oxygen-containing compounds and novel acyclic oxygen- and/or sulfur-containing products. It has been further discovered that the unsaturated compounds thus produced by reacting under controlled conditions 2 - (3,4 - dihydro - 1,2-pyranyl) alkyl ethers with suitable unsaturated alcohols and thiols may be polymerized to form valuable new polymers and, when copolymerized with other polymerizable organic compounds, copolymers. The novel polymerizable unsaturated compounds form further objects of the invention. Still further objects of the invention comprise the novel polymers and copolymers that are obtained, and the method of polymerizing the novel monomers to produce the desired copolymers.

Still further objects of the invention will become apparent hereinafter.

The novel derivatives of tetrahydropyran that are produced according to the invention and that form one of the important objects thereof, are 2,6-tetrahydropyranylene ethers, 2,6-tetrahydropyranylene sulfides and 2,6-tetrahydropyranylene ether-sulfides wherein the ether- or sulfide-forming oxygen or sulfur atoms, respectively, are directly attached to the tetrahydropyran nucleus at the No. 2 and No. 6 positions thereof, and wherein the extranuclear ether-forming and sulfide-forming radicals are hydrocarbon groups, which may be the same or different, and which preferably may contain from one to eighteen carbon atoms. The term 2,6-tetrahydropyranylene is used in the present specification and in the appended claims to denote the divalent radical of tetrahydropyran

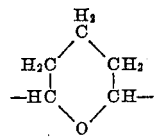

having the free valencies, as shown, at the carbon atoms in the No. 2 and No. 6 positions of the tetrahydropyran ring, respectively, which radical may or may not have one or more hydrogen atoms attached to carbon atoms of the heterocyclic ring replaced by suitable substituent groups. The novel tetrahydropyranylene ethers, sulfides, and ether-sulfides of this invention have structures which conform to the structural formula

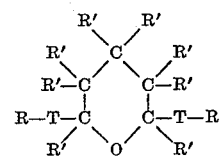

in which each T represents a divalent atom of the group consisting of oxygen and divalent sulfur, each R represents a hydrocarbon group of from 1 to 18 carbon atoms, inclusive, and each R' represents a member of the group consisting of the hydrogen atom and lower hydrocarbon.

It will be observed that the novel compounds of the invention also could be referred to as ethers, sulfides, and ether sulfides of the hypothetical 2,6-tetrahydropyrandiols, 2,6-tetrahydropyranthiols and tetrahydropyran - 2 - ol - 6-thiols, respectively, in which the ether-forming radicals are as hereinbefore and hereinafter defined.

In the 2,6-tetrahydropyranylene ethers, sulfides and ether-sulfides of the invention, the free valencies shown in the above formula are satisfied by union with atoms of oxygen or of divalent sulfur, which atoms are further directly linked to ether- or sulfide-forming radicals containing preferably from one to eighteen carbon atoms. In the broad case still other substituent groups or atoms may be bonded to carbon atoms of the heterocyclic ring. One or more of the hydrogen atoms thereof may have been replaced by an alkyl group, an aryl group, such as a phenyl, a tolyl, a benzyl, a xylyl, a p-methoxyphenyl, a p-chlorophenyl, a naphthyl, or like group, a cycloaliphatic group, such as cyclopentyl, or a cyclohexyl group, an olefinic group, such as allyl, vinyl, methallyl, cyclopentenyl, or a cyclohexenyl group, or a substituted alkyl group, such as the carboethoxymethyl group, the 2-methoxyethyl group, an amino-ethyl group, etc. Alkyl groups bonded to carbon atoms of the 2,6-tetrahydropyranylene radicals may contain from one to twenty carbon atoms, and preferably from one to nine carbon atoms, and may include, for example, methyl, ethyl, propyl, isopropyl, butyl, sec-butyl, t-butyl, pentyl, hexyl, decyl, dodecyl, and even stearyl, and their analogs and homologs. Especially valuable compounds of the invention are those in which the 2,6-tetrahydropyranylene nucleus is unsubstituted and those in which the 2,6-tetrahydropyranylene nucleus is substituted by one or more alkyl groups containing from one to eight carbon atoms.

The substituted tetrahydropyrans of the invention contain a unique and peculiarly reactive grouping of atoms that makes the compounds capable of undergoing reaction with various chemical reagents. The new compounds are valuable as intermediates for the preparation of various organic chemicals. Solutions prepared by dissolving the compounds in water have the unexpected property of coagulating or precipitating proteins from aqueous solution and of hardening or insolubilizing proteins. Compounds of the invention, accordingly, may be used in leather treating and for hardening casein as well as for precipitating solutions of proteins. Tetrahydropyranylene diethers of the invention possess, due to the attachment of the ether-forming radicals at the 2 and 6 positions of the ring, unique properties suited to the preparation of compositions toxic to life, e. g., insect life. When the ether-forming or sulfide-forming hydrocarbon radicals are suitable unsaturated hydrocarbon groups, the 2,6-tetrahydropyranylene ethers, sulfides and ether-sulfides of the invention are especially useful as resin-forming intermediates that may be polymerized to form valuable homopolymers, or that may be copolymerized with other polymerizable organic compounds to produce valuable copolymers. A preferred group of compounds within the invention comprises the 2,6-tetrahydropyranylene ethers, ether-sulfides, and sulfides in which the ether-forming or sulfide-forming hydrocarbon group is an olefinic hydrocarbon group. Although the olefinic hydrocarbon group may contain as small a number as two and as many as eighteen carbon atoms, preferred compounds are those wherein the olefinic hydrocarbon group contains from three to eight carbon atoms. Particularly valuable 2,6-tetrahydropyranylene ethers, ether-sulfides and sulfides are those in which the olefinic hydrocarbon group contains an olefinic bond in the allyl position relative to the oxy oxygen or thio sulfur atom, that is, between two carbon atoms, one of which is directly attached to a saturated carbon atom that, in turn, is directly linked to the said oxygen or sulfur atom. Those compounds which thus contain an allylic bond, in which the allylic bond also is the double bond of a methylene group ($=CH_2$), are of signal value for the preparation of polymers and copolymers, and constitute a particularly preferred group of compounds within the broader concepts of the invention.

Olefinic hydrocarbon groups which may be the ether-forming or sulfide-forming hydrocarbon radicals include, among others, allyl, methallyl (isobutenyl), crotyl, 2-ethyl-2-propenyl, 3-phenyl-2-propenyl, 2-methyl-2-butenyl, 2-methyl-2-pentenyl, 2-cyclohexyl-2-propenyl, 2-pentyl-2-propenyl, 2-decyl-2-butenyl, as well as 2-(3-methyl-2-cyclopentyl), 2-methoxymethyl-2-propenyl, and even 2-carbethoxymethyl-2-butenyl.

Although preferred 2,6-tetrahydropyranylene ethers, ether-sulfides, and sulfides of the invention contain olefinic ether-forming and/or sulfide-forming hydrocarbon radicals, the invention in its broader aspects is not limited thereto. Also included in the generic concepts are those compounds in which at least one of the extranuclear ether-forming or sulfide-forming radicals is a saturated hydrocarbon group or, for example, an aryl group, such as a phenyl or a substituted phenyl radical, or a cycloaliphatic group. Because of the ease and efficacy with which they may be prepared, a desirable group of compounds contain ether-and/or sulfide-forming radicals containing from one to eighteen carbon atoms, those compounds wherein said radicals contain from one to eight carbon atoms being particularly preferred. Suitable saturated aliphatic and cycloaliphatic ether- or sulfide-forming radicals include the following exemplary groups: methyl, ethyl, isopropyl, butyl, hexyl, octyl, decyl, hendecyl, tetradecyl, hexadecyl, and even octadecyl, as well as, e. g., cyclopentyl, cyclohexyl, methylcyclopentyl, propylcyclohexyl, decahydronapthyl, cyclohexylcyclopentyl, and analogous and homologous groups. Suitable aryl (i. e., aromatic) groups include the following: phenyl, naphthyl, anthryl, p-chlorophenyl, xylyl, tolyl, p-aminophenyl, p-t-butylphenyl, p-ethoxyphenyl, and homologous and analogous groups.

The following compounds are illustrative of aspects of the invention:

2,6-diallyloxytetrahydropyran
2-allyloxy-6-methallyloxytetrahydropyran
2,6-dimethallyloxy-4-methyltetrahydropyran
2,6-bis(2-butenyloxy)tetrahydropyran
2,6-bis(2-ethyl-2-propenyloxy)tetrahydropyran
2-methoxy-6-allyloxytetrahydropyran
2-isobutoxy-4-methyl-6-methallyloxytetrahydropyran
2-methallyloxy-5-ethyl-6-butoxytetrahydropyran
2-(2-butyl-2-propenyloxy)-6-allyloxytetrahydropyran
2-(2-propyl-2-propenyloxy)-5-methyl - 6 - pentoxytetrahydropyran
2-allyloxy-6-methyl-6-methoxytetrahydropyran
2,6-diallyloxy-6-phenyltetrahydropyran
2-methoxy-6-(2-octenyloxy)tetrahydropyran
2-butoxy-6-(2-butyl-2-butoxy)tetrahydropyran
2,6-diisobutoxytetrahydropyran
2-methoxy-4-ethyl-6-pentoxytetrahydropyran
2-propoxy-5-methyl-6-octyloxytetrahydropyran
2-isopropoxy-6-phenoxytetrahydropyran
2-isobutoxy-6-decyloxytetrahydropyran
2-methoxy-6-(phenylmercapto)tetrahydropyran
2-isobutoxy-4-methyl-6-(p-chlorophenoxy)tetrahydropyran 2-allyloxy-6-(phenylmercapto)tetrahydropyran
2,6-bis(phenylmercapto)tetrahydropyran
2,6-bis(methoxyethoxy)tetrahydropyran Homologous and analogous compounds to the foregoing are included within the generic concepts of the invention.

It has been discovered in accordance with the invention that the foregoing and analogous compounds of the invention may be prepared by reacting 2-(3,4-dihydro-1,2-pyranyl) ethers with suitable ROH compounds and RSH compounds in the liquid state in the presence of an acidic catalyst. It has been discovered that by suitably controlling reaction conditions, either one or both of the reactions decribed immediately below may be made to predominate. Describing the reactions between 2-(3,4-dihydro-1,2-pyranyl) methyl ether and allyl alcohol as exemplary (but not limiting) the reactions are thought to proceed substantially as follows:

I.

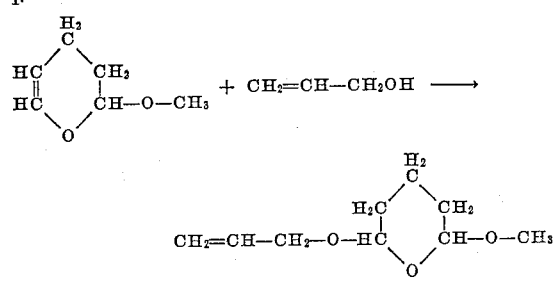

II.

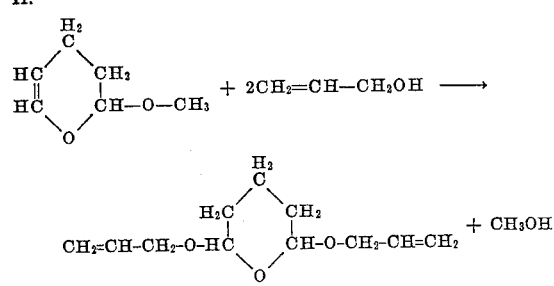

In addition to the above reactions, the following reactions may occur, generally to form by-products present in minor amount. The by-products often are in themselves useful products, some of them novel and having unique properties.

III.

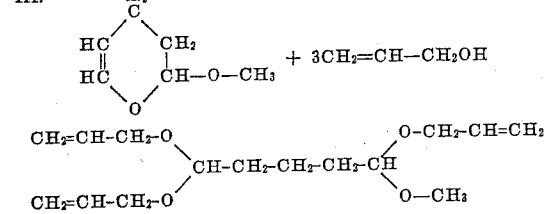

IV.

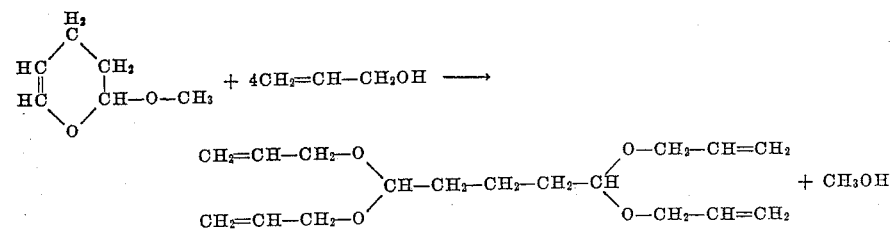

The foregoing reactions, particularly those designated as Nos. I and II, may be accomplished by mixing the dihydropyranyl ether with a suitable ROH or RSH compound in the presence of an acid reacting material. In some cases reaction thereupon occurs spontaneously, whereas in others moderate application of heat is desirable to accelerate the reaction. Temperatures of from about ordinary room temperatures up to 200° C. may be employed, a preferred range of reaction temperature being from about 40° C. to about 150° C. If the temperature employed is above the boiling point of the reaction mixture under atmospheric pressure, superatmospheric pressures may be employed to prevent undesired volatilization of the reactants.

The process of the invention is executed in the presence of a suitable acid-reacting material. As the acid-reacting material, there may be employed, for example, any suitable strong mineral acid, acid-reacting salt, or organic acid. Also suitable are materials which react in situ to produce acidic conditions. The acidic catalyst desirably is one that is soluble in the reaction mixture, although even substantially insoluble acidic materials may be used. Suitable catalysts include, without being limited to, mineral acids, such as HCl, HBr, $H_2SO_4$, $H_2SeO_4$, $HNO_3$, HF, HI, $H_3PO_4$, $H_3AsO_4$, $H_4P_2O_7$, $H_2SO_3$, $HPO_3$ and $H_2PO_3$, acidic salts, such as $NaHSO_3$, $NaHSO_4$, $NaH_2PO_4$, $KH_2PO_4$, $MgCl_2$, $Al_2(SO_4)_3$, organic acids, such as oxalic acid, p-toluene sulfonic acid, chloroacetic acid, and acetic acid. If the ROH or RSH reactant is one that in itself is acidic, e. g., a phenol, it may also serve to catalyze the desired reaction and addition of a separate catalyst may be dispensed with. The amount of the catalyst used will depend upon its acidic strength, the conditions under which the process is executed, and the reactants involved. Generally, from about 0.001% to about 5% of acid reacting material, based upon the weight of the reactants may be used, a preferred range being from about 0.01% to about 1% by weight of the reactants.

It unexpectedly has been discovered in accordance with the invention that the relative proportions of the reactants present critically determines the product that will be produced in the principal amount. Broadly, from about .5 to about 20 moles of the ROH or RSH compound per mole of the dihydropyranyl ether may be employed. It has been discovered that when the amount of the ROH or RSH compound is limited to not over about 2 moles per mole of the dihydropyranyl ether, the predominating reaction product is the one formed as in Equation I, that is, by reaction between equimolar amounts of the ROH or RSH compound and the dihydropyranyl ether. It has been surprisingly discovered that when more than about 2 holes of the ROH or RSH compound is employed per mole of the dihydropyranyl ether, the reaction illustrated by Equation No. I no longer predominates, but, instead, that the reaction exemplified by Equation II tends to predominate. To the best of our knowledge, the prior art would not have enabled one to expect that reaction as shown by Equation II would be achievable, let alone that it could have been accomplished to produce the resulting product in predominating amounts. For accomplishing the reaction as in Equation II, there desirably is employed from about 2 to about 10 moles of the ROH or RSH compound per mole of the dihydropyranyl ether. At the same time, minor amounts of products formed as in Equations III and IV may be produced. Still larger relative amounts of the ROH or RSH compound favor the formation of these latter products in predominating amounts.

The process of the invention may be carried out in any suitable reaction vessel, and may be accomplished by batchwise, intermittent or continuous procedures. A preferred procedure, when it is desired to cause more than one molecule of the ROH or RSH compound to react with the dihydropyranyl ether, comprises removing the alcohol having the alkoxy group of the dihydropyranyl alkyl ether from the reaction mixture at a rate substantially equal to its rate of evolution therein. This may be accomplished, for example, by heating the reaction mixture substantially at its boiling point, condensing the evolved vapors and separating from the condensate a fraction rich in the alcohol having the alkoxy group of the reactant dihydropyranyl ether, and continuously returning the rest of the condensate to the reaction vessel. The reactant dihydropyranyl alkyl ether preferably may be one in which the alkoxy group is the alkoxy group of a lower alkanol, e. g., methanol, ethanol, propanol, butanol, or their branched-chain analogs. The process may be carried out in, for example, a reaction vessel equipped with a fractionating reflux column, and while the mixture is heated to boiling temperatures the vapors may be fractionally condensed and the fraction containing the lower alkanol continuously withdrawn. The extent of the reaction may be determined and followed by the amount of the lower alkanol liberated. The heating with separation of evolved alcohol product from the reaction mixture may be continued until the reaction has gone to substantial completion, or it may be interrupted before the reaction is completed.

The desired products may be recovered from the reaction mixture by any convenient method. Fractional distillation is a generally satisfactory method. Other methods may be employed in appropriate cases, including, for example, treatment with selective solvents, crystallization, etc.

The 2,6-tetrahydropyranylene ethers, ether-sulfides, and sulfides of the invention in which the ether- or sulfide-forming radicals are allyl-type hydrocarbon groups, preferably an allyl-type hydrocarbon group wherein the olefinic bond is the double bond of a methylene group ($=CH_2$), are of outstanding value for the preparation of new and improved polymers, and copolymers with other polymerizable organic compounds. According to the invention, the 2,6-tetrahydropyranylene ethers, ether-sulfides, and sulfides are subjected to polymerization by the action of heat, light, and/or suitable polymerization catalysts. Heat alone tends to result in a moderate, easily-controlled polymerization reaction. Temperatures of about 150° C. to 300° C. may be used. In employing such elevated temperatures the use of superatmospheric pressures is necessary if the temperature is above the boiling point of the monomer, since it appears that the polymerization occurs in the liquid phase and, accordingly, it is necessary to maintain at least a part of the monomeric compound in the liquid phase. Light, preferably light in the ultra-violet region of the spectrum, may be used to increase the rate of polymerization. The polymerization may be accelerated by exposure of the polymerizing mass to light having wave-lengths of about 2000 to about 4000 angstron units. Preferably the polymerization is effected by the combined action of heat and an oxygen-yielding compound with the temperature of operation at from about 50° C. to about 250° C. Preferred oxygen-yielding compounds are molecular oxygen-containing gases and peroxide compounds. Suitable molecular oxygen-containing gases include pure oxygen, air, oxygen-enriched air, and air or oxygen in admixture with inert gases. Peroxide compounds that may be used in combination with heat include both organic and inorganic peroxides, such as hydrogen peroxide, benzoyl peroxide, barium peroxide, sodium peroxide, olefin peroxides, tertiary butyl peroxide, acetone peroxide, and the like. Among other oxygen-yielding compounds which may be employed are included, for example, alkali metal perborates and the alkali metal persulfates. When the polymerization is accomplished with the aid of a molecular oxygen-containing gas, the monomeric compound may be heated and at the same time aerated with the gas, temperatures of from about 100° C. to about 175° C. being particularly suitable. Pressures sufficient to maintain at least a part of the monomeric compound in the liquid phase are used. Peroxide polymerization catalysts may be employed in amounts from about 0.1% to about 15% of the weight of the monomers, a preferred range being from about 1% to about 10% of the weight of the monomers. The catalyst may be added all initially, or it may be added to the polymerizing mixture in portions or continuously during the polymerization. The slow addition of the catalyst to the polymerizing mixture has the advantage that it generally enables the use, where desired, of temperatures somewhat higher than would otherwise be possible since it decreases the difficulties that are encountered at high temperatures from destruction of the catalyst.

Polymerization of the 2,6-dihydro-1,2-pyranylene ethers, ether-sulfides, and sulfides may be accomplished either in bulk, in solution, or in heterogeneous suspension or emulsion in inert liquids. Copolymers may be prepared by copolymerizing different 2,6-tetrahydropyranylene ethers, ether-sulfides and sulfides. Valuable copolymers also may be prepared from mixtures of the compounds of the invention with other polymerizable organic compounds containing one or more polymerizable groups such as compounds containing the $CH_2=C<$ or vinylidene group, as in styrene, diallyl phthalate, allyl allyloxypropionate, vinyl acetate, acrylonitrile, methyl methacrylate, butadiene-1,3, and vinyl chloride. Copolymers containing from 5% to 98%, preferably from 55% to 95%, of the 2,6-tetrahydropyranylene derivative are of particular value.

The polymers and copolymers of the invention include viscous liquids to soft to hard resinous polymers. Especially valuable are soft, greasy or unctuous polymers that may be prepared by polymerization as described above of the 2,6-dihydropyranylene diethers in the presence of heat and a peroxide compound. They may be employed, for example, as the matrix of sealing or caulking compositions, or putties. The soft polymers of the invention can be employed as plasticizers and softeners for plastic materials, such as cellulose derivatives like nitrocellulose, cellulose esters and cellulose ethers, as well as for synthetic resins and rubbers. Despite their unctuous nature, the soft polymers of the invention appear to be cross-linked three-dimensional polymers. They are substantially insoluble in the common organic solvents and in water. They exhibit an admirable resistence to exposure to water, heat, and chemical agents. They are of considerable interest for treating leather. For example, they may be worked into the surface of leather to improve its water-resistance and to soften the leather or render it more pliable. They also appear to have an important application as lubricants for rope, cordage, twine, and the like. Small amounts applied thereto or to the fibers before laying materially increase the pliability of the rope, etc., and, further, enhance its tensile properties.

The following examples are presented to illustrate certain embodiments of the invention as it is more broadly described in the hereto appended claims.

Example I

Seventy-eight grams of 2-(3,4-dihydro-1,2-pyranyl) isobutyl ether and 74 grams of isobutyl alcohol were mixed in a glass flask at room temperature. To the mixture there was added 0.1 gram of concentrated hydrochloric acid ($d.=1.2$). Reaction occurred spontaneously with evolution of heat. The temperature of the reaction mixture was maintained below 50° C. by occasional cooling. After about two hours the reaction subsided. The mixture was distilled through a fractionating column. 2,6-diisobutoxytetrahydropyran was collected as the fraction distilling between 100° C. and 12° C. under 10 millimeters mercury pressure; amount of fraction, 86 grams, corresponding to a 75% yield on the dihydropyranyl isobutyl ether consumed. Upon redistillation of the collected fraction, the 2,6-diisobutoxytetrahydropyran was obtained in better than 90% recovery as a clear mobile fragrant liquid boiling at 63° C. under 0.07 millimeters mercury pressure, having a refractive index ($n\ 20/D$) of 1.4322, a specific gravity (20°/4°) of 0.9177 and containing 67.64% carbon and 11.35% hydrogen (theory for $C_{13}H_{26}O_3$, 67.78% carbon and 11.38% hydrogen). The product appeared to have properties admirably suited to a medium-high boiling solvent useful in special applications.

Example II

Eighty grams of 2-(3,4-dihydro-1,2-pyranyl)-isobutyl ether, 40 grams of phenol, and 0.1 gram of concentrated hydrochloric acid were mixed. Spontaneous reaction occurred, with increase in the temperature of the mixture to 55° C. The mixture was allowed to stand for 12 hours, and then fractionally distilled. The product was separated in 52% conversion based upon the dihydropyranyl isobutyl ether employed, as the fraction distilling between 110° C. and 115° C. under 1 millimeter mercury pressure. The product, 2-isobutoxy-6-phenoxytetrahydropyran, was purified by redistillation of the collected fraction. The 2-isobutoxy-6-phenoxytetrahydropyran distilled at 104° C. under 0.5 millimeters mercury pressure, and had a refractive index ($n\ 20/D$) of 1.4398 and a specific gravity (20°/4°) of 1.0221. Analyses: found, 71.67% carbon and 8.85% hydrogen; theory for $C_{15}H_{22}O_3$, 71.96% carbon and 8.86% hydrogen. The product was a clear oily liquid having a pungent odor.

Example III

This experiment, in contrast to the foregoing two experiments, resulted in the reaction of two molecules of the reactant alcohol with the dihydropyranyl ether. A mixture of 85.5 grams of 2-(3,4-dihydro-1,2-pyranyl)methyl ether, 232 grams of allyl alcohol, and 0.1 gram of concentrated hydrochloric acid was prepared in a flask equipped with a fractionating column arranged for reflux condensation and provided for withdrawal from the system of low-boiling fractions. The temperature of the reaction mixture rose spontaneously to 55° C. after mixing. After the initial reaction subsided, heat was supplied and the mixture was refluxed for about three hours, with continuous removal of methanol from the system. After twenty-two grams of methanol was removed, the remaining mixture was fractionally distilled. 2,6-diallyloxytetrahydropyran was recovered in 52% conversion of the dihydropyranyl methyl ether to product as the fraction distilling between 75° C. and 85° C. under 3.3 millimeters mercury pressure. Upon redistillation the 2,6-diallyloxytetrahydropyran distilled at 79.4° C. under 3.3 millimeters mercury pressure. The redistilled product had a refractive index ($n\ 20/D$) of 1.4575 and a specific gravity (20°/4°) of 0.990. It was found to contain 66.2% carbon and 9.1% hydrogen, compared to theoretical values of 66.6% and 9.2%, respectively.

There also was recovered in the distillation of the reaction mixture a further fraction amounting to 80 grams, distilling at 122° C. to 134° C. under 1 millimeter mercury pressure, and identified as the tetra-allyl acetal of glutaraldehyde. The acetal, upon redistillation, boiled at 132° C. under 1 millimeter mercury pressure, had a refractive index ($n\ 20/D$) of 1.4582 and a specific gravity 20°/4°) of 0.951. Analyses: found, 68.88% carbon and 9.56% hydrogen; calculated for $C_{17}H_{28}O_4$, 68.89% carbon and 9.52% hydrogen.

Example IV

One hundred parts of the 2,6-diallyloxytetrahydropyran prepared in the preceding example was heated with 5 parts of di-t-butyl peroxide at 100° C. for 16 hours. The polymer which formed was clear and colorless, and had a soft, unctuous consistency. Its clarity and lack of color made the polymer admirably suited, for example, to use as a softener for white leather products.

Example V

Ninety-six grams of para-chlorophenol and 85.5 grams of 2-(3,4-dihydro-1,2-pyranyl)methyl ether reacted spontaneously upon mixing, with rise in the temperature to 60° C. After 12 hours the mixture was distilled under 1 millimeter mercury pressure. The product, identified as 6-p-chlorophenoxy-2-methoxytetrahydropyran distilled at 106° C. to 116° C. under 1 millimeter mercury pressure; amount, 40 grams. Specific gravity (20°/4°) of the collected fraction was 1.22. In this experiment, the unreacted para-chlorophenol acted as the acidic catalyst.

Example VI

A mixture of 43 grams of 2-(4-methyl-3,4-dihydro-1,2-pyranyl) methyl ether, 64 grams of methanol and 0.1 gram of concentrated hydrochloric acid, when prepared warmed spontaneously to 55° C. When the initial evolution of heat subsided the mixture was heated in a sealed glass tube at 110° C. for six hours. The mixture then was distilled. The fraction 110° C. to 119° C. under 100 millimeters mercury pressure was collected and identified as 2,6-dimethoxy-4-methyltetrahydropyran, obtained in a 65% conversion and 80% yield, based upon the methyl-dihydropyranyl methyl ether consumed and employed, respectively. After redistillation the product boiled at 118° C. to 119° C. under 100 millimeters mercury pressure.

*Example VII*

A mixture of 114 grams of 2-(3,4-dihydro-1,2-pyranyl)methyl ether, 231 grams of thiophenol, and 0.2 gram of concentrated hydrochloric acid was refluxed under a twenty plate fractionating column for about four hours. During this time, 27 grams of material, mostly methanol, were collected at the still-head. Higher boiling volatiles were condensed and returned to the reaction vessel. The reaction mixture then was fractionally distilled. The fraction distilling at 185° C. to 200° C. under 0.5 to about 1 millimeter mercury pressure was collected and redistilled under 1 millimeter mercury pressure. The product, 2,6-diphenylmercaptotetrahydropyran was collected as the fraction distilling at 200° C. to 205° C. It had a refractive index ($n$ 20/D) of 1.625 and a specific gravity (20°/4°) of 1.159. Analyses: found, 20.9% sulfur and 6.07% hydrogen; calculated for $C_{17}H_{18}OS_2$, 21.2% sulfur and 6.00% hydrogen.

*Example VIII*

Glutaraldehyde tetra-allyl acetal, prepared as in Example III, was polymerized by heating at 100° C. in the presence of di-t-butyl peroxide. The resulting polymer was transparent and water-white. It had the consistency of a soft gel with an oily feel and was appreciably elastic. It appeared to have potential value as a lubricant or sealing compound for valve connections and as a resistant sealing compound for threaded connections, e. g., pipes carrying liquids or gases.

I claim as my invention:

1. A chemical compound having a structure defined by the formula

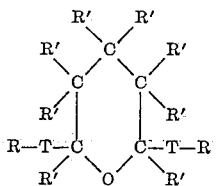

in which each T represents a divalent atom of the group consisting of oxygen and divalent sulfur, each R represents a hydrocarbon group of from 1 to 18 carbon atoms, inclusive, and each R' represents a member of the group consisting of the hydrogen atom and lower hydrocarbon radicals.

2. 2,6 - diarylmercaptotetrahydropyran, said arylmercapto groups each containing from six to eighteen carbon atoms.

3. 2,6-di-2-alkenyloxytetrahydropyran, said 2-alkenyloxy groups each containing from three to eighteen carbon atoms.

4. 2 - (2-alkenyloxy)-6-hydrocarbonoxytetrahydropyran, said 2-alkenyloxy group containing from three to eighteen carbon atoms and said hydrocarbonoxy group containing from one to eighteen carbon atoms.

5. 2,6-diallyloxytetrahydropyran, having the structural formula

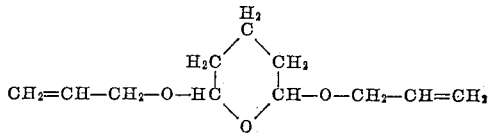

6. 2,6-diphenylmercaptotetrahydropyran, having the structural formula

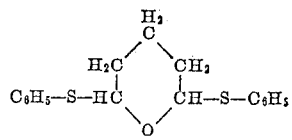

7. Glutaraldehyde tetraallyl acetal.

8. A process for the preparation of 2,6-diallyloxytetrahydropyran which comprises heating a mixture of 2-(3,4-dihydro-1,2-pyranyl)methyl ether and allyl alcohol in the presence of a strong mineral acid at about the boiling point of the mixture, continuing the heating and distilling methanol from the mixture at a rate substantially equal to its rate of evolution therein, and recovering 2,6-diallyloxytetrahydropyran from the resulting mixture.

9. A process of preparing novel polymerizable organic compounds which comprises heating a mixture of a 2-(3,4-dihydro-1,2-pyranyl)alkyl ether with from about 2 to about 10 molecular equivalents of a beta-gamma-olefinic alcohol containing from 3 to 18 carbon atoms in the presence of an acid-reacting material at a temperature from about 40° C. to about 150° C., and continuing the heating and separating from the mixture the saturated alcohol having the alkoxy group of said dihydropyranyl alkyl ether.

CURTIS W. SMITH.

REFERENCES CITED

The following references are of record in the file of this patent:

UNITED STATES PATENTS

| Number | Name | Date |
|---|---|---|
| 2,422,648 | Williams et al. | June 17, 1947 |
| 2,455,776 | Jones et al. | Dec. 7, 1948 |